US008028287B2

(12) United States Patent
Golitschek Edler Von Elbwart et al.

(10) Patent No.: US 8,028,287 B2
(45) Date of Patent: Sep. 27, 2011

(54) METHOD AND SCHEDULER FOR PERFORMING A SCHEDULING ALGORITHM WITH MINIMUM RESOURCE PARAMETER

(75) Inventors: Alexander Golitschek Edler Von Elbwart, Darmstadt (DE); Christian Wengerter, Kleinheubach (DE)

(73) Assignee: Panasonic Corporation, Osaka (JP)

( * ) Notice: Subject to any disclaimer, the term of this patent is extended or adjusted under 35 U.S.C. 154(b) by 1030 days.

(21) Appl. No.: 10/594,566

(22) PCT Filed: Mar. 31, 2004

(86) PCT No.: PCT/EP2004/003422
§ 371 (c)(1),
(2), (4) Date: Oct. 1, 2007

(87) PCT Pub. No.: WO2005/096557
PCT Pub. Date: Oct. 13, 2005

(65) Prior Publication Data
US 2008/0098400 A1    Apr. 24, 2008

(51) Int. Cl.
*G06F 9/46* (2006.01)
*H04B 7/00* (2006.01)
(52) U.S. Cl. ........ 718/104; 718/102; 718/103; 718/107; 455/509; 455/512; 455/513
(58) Field of Classification Search ............. 718/102, 718/103, 104, 105, 107, 100, 101, 509, 512, 718/513; 455/450, 452, 509, 513; 370/335
See application file for complete search history.

(56) References Cited

U.S. PATENT DOCUMENTS

| 6,018,642 | A  | * | 1/2000 | Adachi ................. 340/7.33 |
| 6,212,196 | B1 | * | 4/2001 | Momona ................. 370/449 |
| 6,236,646 | B1 | * | 5/2001 | Beming et al. ............. 370/335 |
| 6,731,947 | B2 | * | 5/2004 | Hoagland et al. ........... 455/517 |
| 6,745,044 | B1 | * | 6/2004 | Holtzman et al. .......... 455/522 |
| 7,085,595 | B2 | * | 8/2006 | Kitchin ................. 455/574 |
| 7,174,180 | B2 | * | 2/2007 | Andrews et al. ............ 455/512 |
| 7,450,975 | B2 | * | 11/2008 | Harris ................. 455/574 |
| 2002/0102982 | A1 | * | 8/2002 | Chaponniere et al. ....... 455/450 |
| 2002/0160783 | A1 | * | 10/2002 | Holtzman et al. .......... 455/452 |
| 2002/0181436 | A1 | * | 12/2002 | Mueckenheim et al. .... 370/349 |

(Continued)

FOREIGN PATENT DOCUMENTS

JP    2001-148883    5/2001

(Continued)

OTHER PUBLICATIONS

English translation of Japanese Office Action dated Jul. 14, 2009.

(Continued)

*Primary Examiner* — Emerson Puente
*Assistant Examiner* — Willy W Huaracha
(74) *Attorney, Agent, or Firm* — Dickinson Wright PLLC (57) ABSTRACT

A method for performing a scheduling algorithm with minimum resource scheduling in a mobile communication system, comprising the steps of scheduling (10) allocation units for a user or service in a scheduling frame, checking whether (20) the allocation units scheduled for a user or service in a particular scheduling frame meet a resource constraint, and releasing the allocation units (40) scheduled for a user or service for that particular scheduling frame for based on the result of the checking step for resource constraint. The invention also concerns a scheduler in a mobile communication system, a base station and mobile terminal comprising such a scheduler and a mobile communication system.

19 Claims, 6 Drawing Sheets

U.S. PATENT DOCUMENTS

| | | |
|---|---|---|
| 2003/0104817 A1 | 6/2003 | Damnjanovic |
| 2004/0053574 A1 | 3/2004 | Klein |
| 2004/0141460 A1* | 7/2004 | Holtzman et al. ............ 370/216 |
| 2006/0019662 A1* | 1/2006 | Andrews et al. ........... 455/435.3 |
| 2008/0117881 A1* | 5/2008 | Golitschek Edler Von Elbwart et al. ............................. 370/335 |

FOREIGN PATENT DOCUMENTS

| | | |
|---|---|---|
| JP | 2001-320762 | 11/2001 |

OTHER PUBLICATIONS

Paul J. M., et al.; "Energy-efficient TDMA Medium Access Control protocol scheduling," XP-001183867, proceedings of the asian international mobile computing conference- AMOC 2000, Nov. 2000, pp. 1-9.

* cited by examiner

METHOD AND SCHEDULER FOR PERFORMING A SCHEDULING ALGORITHM WITH MINIMUM RESOURCE PARAMETER

This invention relates to communication systems. It is particularly applicable to wireless communication system where a scheduling algorithm assigns channel resources to users for transmission and reception of data. More specifically, the present invention relates to a method and scheduler for performing a scheduling algorithm as set forth in the independent claims.

In a cellular mobile communication system, the mobile station usually transmits and receives information to and from a base station using channel resources such as time slots, frequency bandwidth, code sequence, or combinations thereof. These resources are generally shared among users of the communication system.

In an ad-hoc mobile communication system, a radio access point usually transmits and receives information to and from other radio access points within the same ad-hoc network, using channel resources such as time slots, frequency bandwidth, code sequence, or combinations thereof. These resources are generally shared among users of the communication system. In such an ad-hoc network, there may either be a dedicated master access point for managing the ad-hoc network, or alternatively one radio access point may adopt the master access point functionalities for management of the ad-hoc network.

It should be apparent to those skilled in the art that a cellular base station and an ad-hoc master access point share at least part of the responsibilities for managing the resources and users within their area of coverage. Similarly the role of a radio access point in an ad-hoc network has a lot in common to the role of a mobile device in a cellular wireless system. For matters of simplicity the following description shall be referring to a cellular wireless network. Changes required for application of the present invention to ad-hoc networks are easily derived for those skilled in the art from the description.

In the context of wireless communication, all operations involved in either transmitting or receiving data are referred to as processing data. In order to process data, the mobile device has to expend operating and processing power for its equipment. From an economical point of view, the most reasonable expenditure of this power is obtained if in return the mobile receiver processes a lot of data while the power is spent. On the other hand, such power is rather wasted if while expending the power no or little data is processed.

The allocation of data to a user via the channel resource is usually done by a scheduling algorithm. At least for downlink, i.e. for the transmission direction from base station to mobile terminal, such a scheduler is usually operating in the base station or other parts of the non-mobile entities within the communication system. Such a scheduler usually evaluates parameters such as service data rate, channel state, but does not take into account an economic factor as described above. Even for uplink, i.e. for the transmission direction from mobile terminal to base station, a scheduler may operate in a central node (e.g. base station in cellular systems, master station in an ad-hoc network) to allocate resources. The result of such central node scheduling may then be transmitted to the mobile entities.

Figure 1:
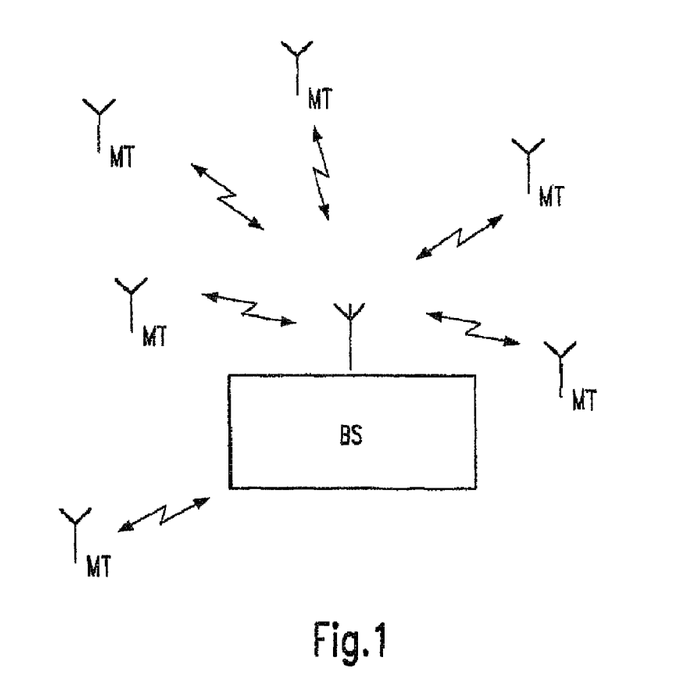
FIG. 1 illustrates the cellular concept consisting of one base station and six mobile terminals.

In wireless communication systems employing Dynamic Channel Assignment (DCA) schemes air-interface resources are assigned dynamically to links between a base station (BS) and multiple mobile terminals (MT). A layout of a typical communication system is shown in FIG. 1, wherein a BS serves several MTs in a service area. The air-interface resources are usually defined by a logical channel, where a logical channel corresponds to e.g. one or multiple codes in a CDMA system, one or multiple subcarriers in an OFDM system, one or multiple timeslots in a TDMA system (e.g. GSM), or to combinations of those e.g. in an OCDMA or an MC-CDMA system. DCA can be applied to uplink and downlink.

Employing Adaptive Modulation and Coding (AMC), the data-rate within a scheduling frame for a scheduled MT will be adapted to the instantaneous channel quality of the respective link by changing the modulation and coding scheme dynamically. AMC is typically applied jointly with DCA.

In a system making use of DCA and AMC a so-called scheduler decides which resources are assigned to which MT. A commonly used approach is to use centralized scheduling, where the scheduler is located in the BS and performs its decision based on the following side information, such as channel quality information of the links to the MTs or offered traffic for specific links e.g. amount of data available for transmission to a specific MT.

Common objectives of the scheduler are to achieve fairness between users, maximize system throughput and/or fulfill Quality of Service (QoS) requirements (e.g. delay, data-rate, loss rate, jitter) for the services run by the scheduled mobile terminals. In state-of-the-art wireless communication systems the scheduler works on a packet basis.

The following schedulers are well known examples in the area of wireless communications:
Round Robin (RR) Scheduler:
    This scheduler allocates equal air-interface resources to all MS independent of the channel conditions thus achieving fair sharing of resources.
Max-Rate (MR) or Max C/I (MC) Scheduler:
    This scheduler chooses the user with the highest possible instantaneous data-rate (carrier-to-interference C/I ratio). It achieves the maximum system throughout but ignores the fairness between users.
Proportional Fair (PF) Scheduler:
    This scheduler maintains an average data-rate transmitted to each user within a defined time window and examines the ratio of the instantaneous to the average channel conditions (or ratio of the instantaneous possible data-rate to the average data-rate) experienced by different users and chooses the user with the maximum ratio. This scheduler increases the system throughput with respect to RR scheduling, while maintaining some degree of long-term fairness.

More detailed information on the structure and function of a scheduler can be obtained for example from US 2003/0104817 which discloses a method for scheduling multiple users sharing a communication resource, particularly relating to high data rate wireless transmission putting emphasis on QoS considerations.

In current systems, a terminal may transmit signals to tell the scheduler what data rate is necessary to satisfy the user or service. Among other parameters, this may involve an average connection (or service) data rate and a maximum allowable delay. However, the scheduling at BS cannot know whether an MT is working efficiently in terms of power consumption for reception of data.

The object underlying the present invention is to provide a method and scheduler for performing a scheduling algorithm with minimum resource scheduling.

This object is solved by a method and a scheduler as set forth in the independent claims.

The invention is based on the recognition that from the viewpoint of the MT in an effort to work economically reasonable, it is either preferred that allocation units are scheduled to a user or a service such that either a minimum resource constraint is satisfied or that the allocation units scheduled for that user for a particular scheduling frame are released, i.e. no data is transmitted to that specific user in order to enable the MT, for instance to switch off receiver circuitry in order to save power resources.

A scheduler has information about QoS parameters and other constraints that have influence of the assignment of allocation units (AU) to an MT. Among those parameters, there exists a long-term average or minimum resource figure to meet the overall satisfaction demands, as well as a short-term minimum resource figure that represents a number of resources that should at least be assigned to the user in a scheduling frame. In case this short-term figure is not met by the scheduling algorithm, the preferred solution is to free the AUs for that user in that particular scheduling frame and to wait for subsequent scheduling frames when more resources can be assigned to the user.

According to a preferred embodiment, the scheduling step includes considering at least one or a combination of the scheduling parameters channel condition, amount of data available for transmission to a specific user, quality of service, delay, data rate or a carrier to interference ratio.

Preferably, the scheduling frame has at least one or a combination of a time division, frequency or code division frame structure.

According to one embodiment, the resource constraint is a long-term user or service based requirement which may be monitored for several scheduling frames.

According to a further embodiment, the resource constraint is a short-term frame-based requirement and consequently monitors instantaneous resource constraints.

Preferably, the allocation units scheduled for a user or service have a quantity of either transmittable information bits, internet protocol packets, code blocks or modulation symbols.

According to a preferred embodiment, the scheduling algorithm comprises the additional step of checking whether at least one other resource constraint is not violated by releasing allocation units. Only if a violation by such release does not occur, the allocation u nits are released. In this way, it is ensured that other more urgent long-term based requirements are fulfilled even if the short-term frame-based requirement is not met.

According to an advantageous embodiment, the step of determining the violation of at least one other constraint comprises determining the quality of service parameters such as maximum allowable delay or long-term data rate.

According to an advantageous embodiment, the released allocation units are used in rescheduling the available allocation units to another user or service for a particular frame. In this manner, the resources are used in an optimal manner.

According to a preferred embodiment, the result of the scheduling algorithm is signaled to the MT in order to enable it to adapt itself to a possible release of allocation units and to take appropriate measures, for instance, shutting down at least part of its receiver circuitry in order to save power. Preferably, the signaling is transmitted on an associated control channel or broadcast channel in order not to congest the logical data channel.

According to a further embodiment, the steps of checking and releasing allocation units for all users are carried out in a time sequential manner rather than simultaneously for all users. This has the advantage that the released allocation units of a particular user can be assigned first to other users before the check on resource constraints for other users is carried out. In this manner, an optimal distribution and instantaneous use of all released allocation units can be attained.

The invention also provides a scheduler in a mobile communication system, a base station controller and a mobile communication system having means for carrying out the method of performing the scheduling algorithm described above.

The invention will be described with reference to the following preferred embodiments which will be illustrated with reference to the accompanying figures.

Figure 2:
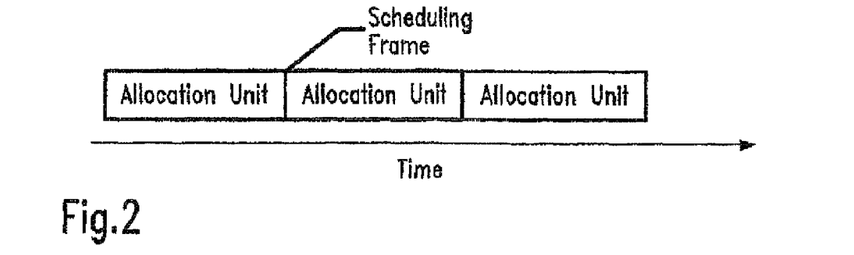
FIG. 2 shows an example of a time-division frame structure, where two allocation units form one scheduling frame.
Figure 3:
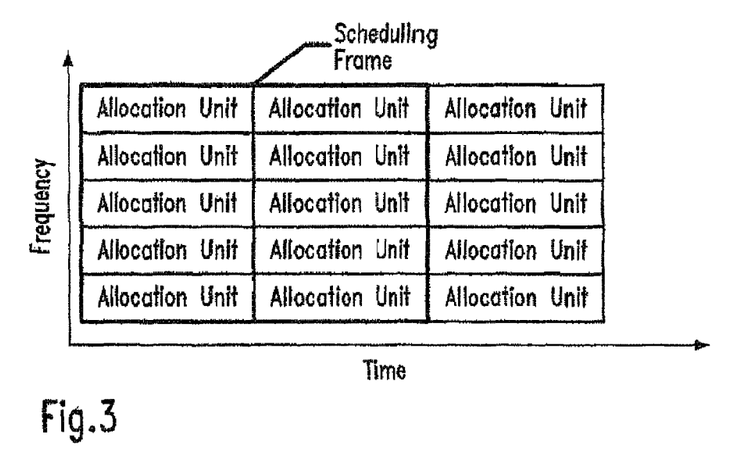
FIG. 3 shows an example of a time/frequency-division frame structure, where ten allocation units form one scheduling frame.
Figure 4:
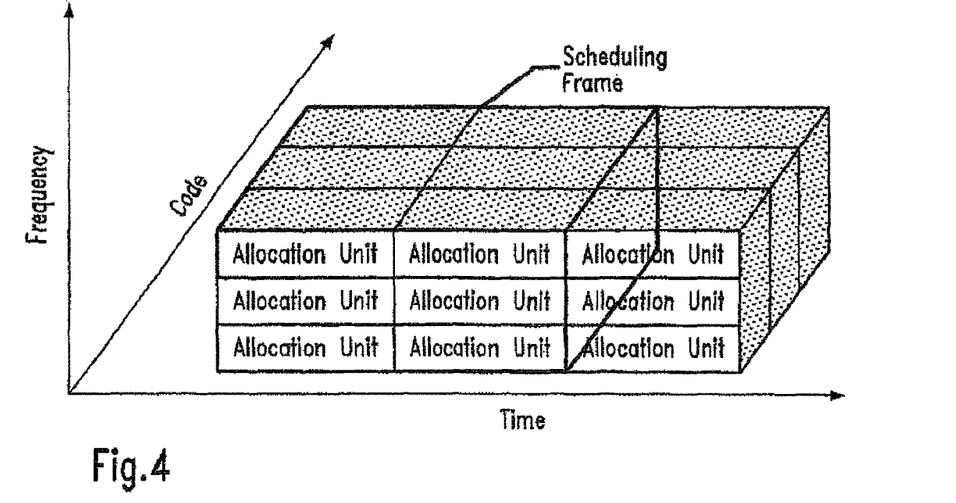
FIG. 4 shows an example of a time/frequency/code-division frame structure, where eighteen allocation units form one scheduling frame.

FIGS. 2 to 4 illustrate the concept of scheduling a frame based on an arbitrary number of allocation units either in the time domain (FIG. 2) the time-frequency domain (FIG. 3) or the time-frequency-code domain (FIG. 4).

As mentioned above, the scheduling is performed in a scheduler usually comprised in the base station or other parts of the non-mobile entities of the communication system.

Figure 5:
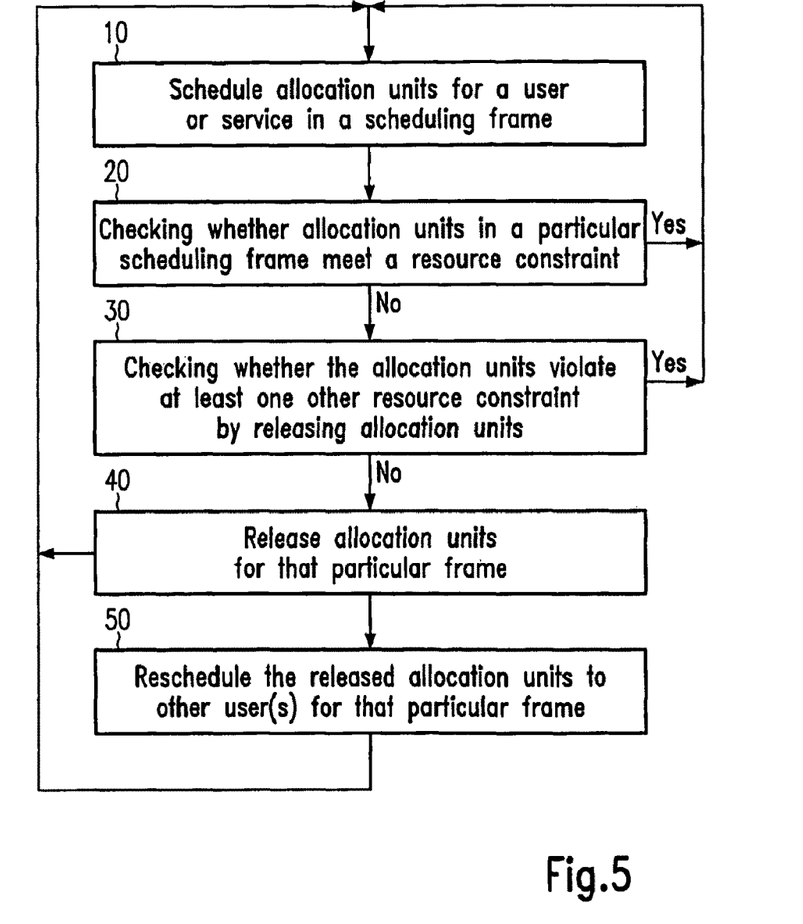
FIG. 5 illustrates a flow chart of the scheduling algorithm according to the invention.

In FIG. 5, the scheduling algorithm is illustrated.

Figure 6:
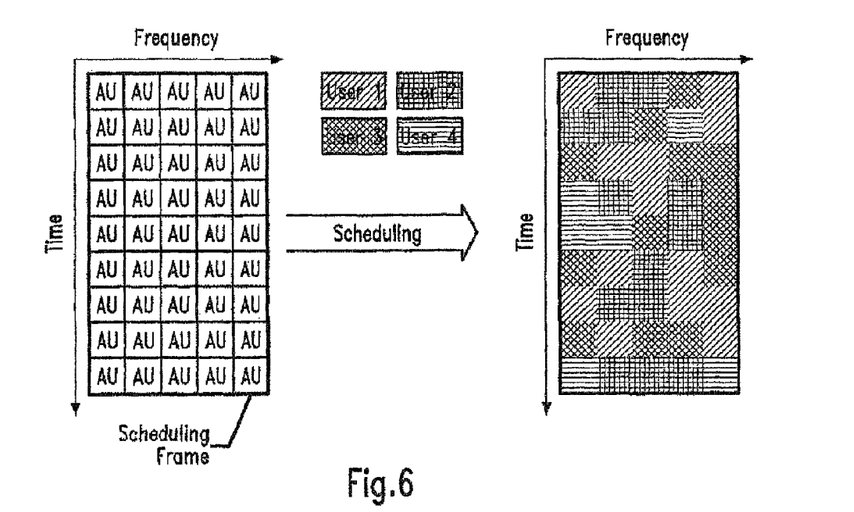
FIG. 6 shows an exemplary scheduling of AUs to users by a prior-art scheduling algorithm.
Figure 8:
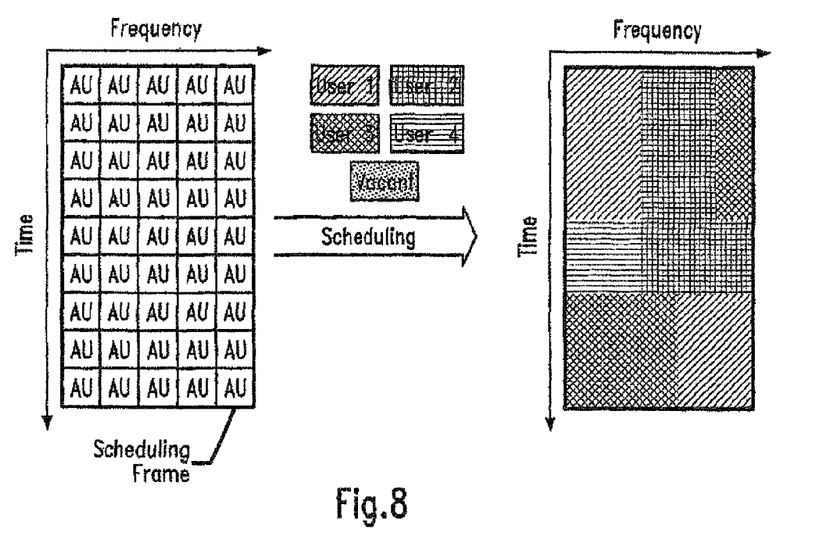
FIG. 8 shows an example of a time-frequency-division frame structure where forty-five allocation units form a scheduling frame by a prior art scheduling algorithm for four users.

In a first step 10, the scheduler schedules allocation units for a user or service in a scheduling frame as exemplary shown in FIGS. 2 to 4. The scheduling of resources is done with conventional methods under consideration of scheduling parameters such as long-term minimum data rate, delay constraints etc. Examples for the scheduling of resources is shown in FIGS. 6 and 8.

In step 20, a check is performed whether the allocation units scheduled to a user in a particular scheduling frame suffice to meet a resource constraint, for instance a short-term minimum resource threshold for one or more mobile terminals.

If so, the scheduling is in order and the algorithm may be restarted for the next user or frame. On the other hand, should the result of the check be negative, i.e. the allocation units do not meet with the resource constraint, the algorithm proceeds with step 30.

In the step 30, it is determined whether the allocation units violate at least one other resource constraint, i.e. more important constraints or quality of service parameters which would be violated by releasing the AUs. Examples for such more important constraints would be a long-term parameter such as delay, data rate etc. Hence, preferably, the fulfillment status of this constraint is additionally monitored over a sliding or fixed time window.

If a violation by releasing is determined in step 30, the scheduling algorithm is restarted for the next user or frame otherwise it proceeds with step 40.

In step 40, the scheduler may release the allocated resources for that particular frame for a user or service provided that this does not violate other constraints or quality of service parameters checked in step 30.

Finally, in step 50, the scheduler reschedules the release allocation units to other user(s) for that particular frame.

It should be understood that the above illustrated scheduling algorithm shown in FIG. 5 serves only as an example. In fact, any arbitrary combination of short-term and long-term resource constraints can be made subject to the decision whether an allocation unit for a particular u ser o r service should be released for a scheduling frame. The checking and determination steps on whether a resource constraint is fulfilled or not may be done with a positive or negative result, i.e. whether the resource constraint is met or not. For instance, in step 30, the determination whether another resource constraint is violated could be replaced by a check whether another resource constraint, for example a long-term resource constraint is met additionally and if so allocation units are released in step 40.

A person skilled in the art is able to define a suitable set of resource constraints which need to be fulfilled or violated dependent on the type of user, the system architecture or instantaneous channel or traffic conditions. As an example, in a simple method, step 20 is done for several users simultaneously before resources are released in step 40. A more sophisticated method applies steps 20 to 40 for a first user before these steps are repeated for a second user.

Figure 7:
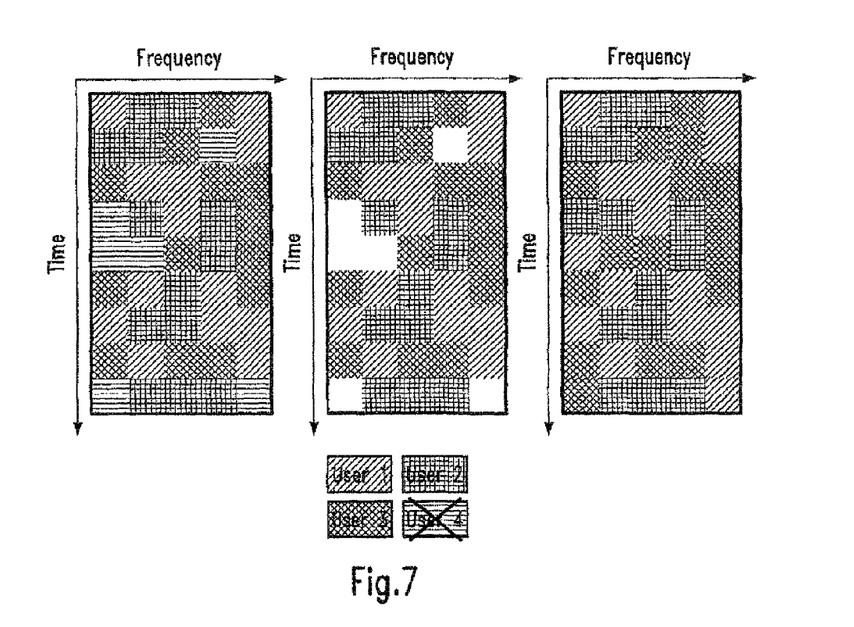
FIG. 7 shows exemplary steps for the scheduling algorithm according to the present invention.
Figure 9:
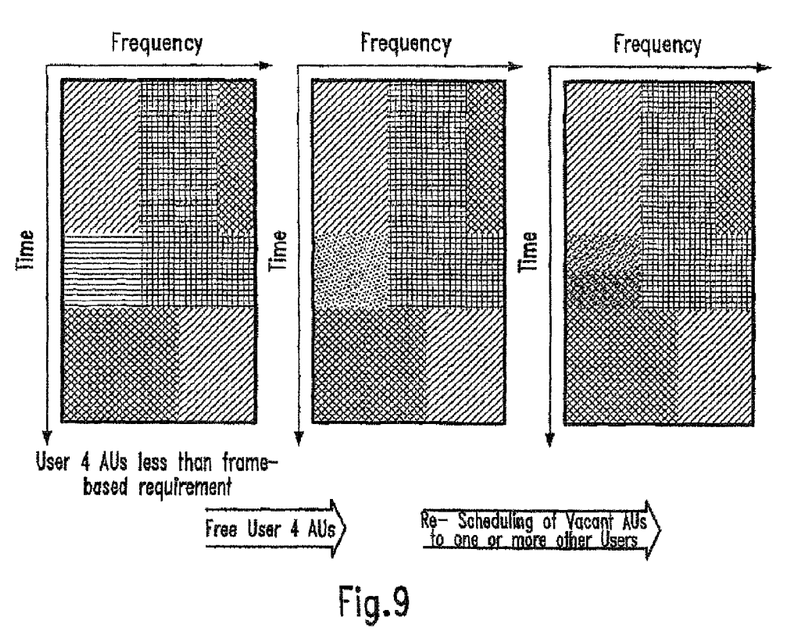
FIG. 9 illustrates the scheduling algorithm according to the present invention for the scheduling frame shown in FIG. 8.

An example for steps 20 to 40 is given in FIGS. 7 and 9. In the beginning (left part), all AUs are allocated to 4 users in the cell. Applying now step 20, the scheduler finds that the AUs allocated to user 4 are insufficient to meet the minimum resource constraint. Following the rule given in step 40, those AUs previously allocated to user 4 are released again for rescheduling (middle part). Rescheduling assigns the now free AUs to any of the other users, which results in an allocation of AUs to users 1-3 according to the right part of the figure.

It should be mentioned that in this description it is mostly referred to scheduling users. However it is possible to apply the same ideas in a service-oriented (rather than user-oriented) scheduling scenario.

The invention also encompasses the case that not all of the available allocation units are subject to the proposed scheduling approach. Some of the AUs (or users) may be exempt from the checks described in steps 20 and 30 above.

While it has been described above that the scheduler, implemented in the base station determines the resource constraint, the invention also covers cases wherein the resource constraint is given by the communication system design, or is signalled from the MT. In either case, during an ongoing transmission or connection the resource constraint may change its value and a rescheduling may be initiated any time.

Preferably, the minimum resource constraint check is applied to allocation units (e.g. in the time/frequency/code domain) having a quantity of transferable information bits. However, for implementation purposes other quantities may be easier to obtain, calculate or estimate, or may be more representative than bit figures. Such quantities include, but are not limited to a number of modulation symbols, FEC code blocks or Internet protocol packets.

Usually, it is preferred to schedule a large number of adjacent allocation units to a single user. This illustrated in FIG. 8 as compared with FIG. 6. Typically, a complete frequency band is allocated to a user in order to reduce the amount of signaling which needs to be sent from the base station to the mobile terminal.

As mentioned before, the result of the scheduling algorithm obtained in steps 20 and 30 of FIG. 5 may be signaled, preferably in an associated control channel, to the mobile terminal. Hence, the terminal can adjust itself to this situation that it will not receive scheduled allocation units in the current scheduling frame. In response thereto, for example, the mobile terminal can shut down parts of its receiving circuitry in order to save energy.

Figure 10:
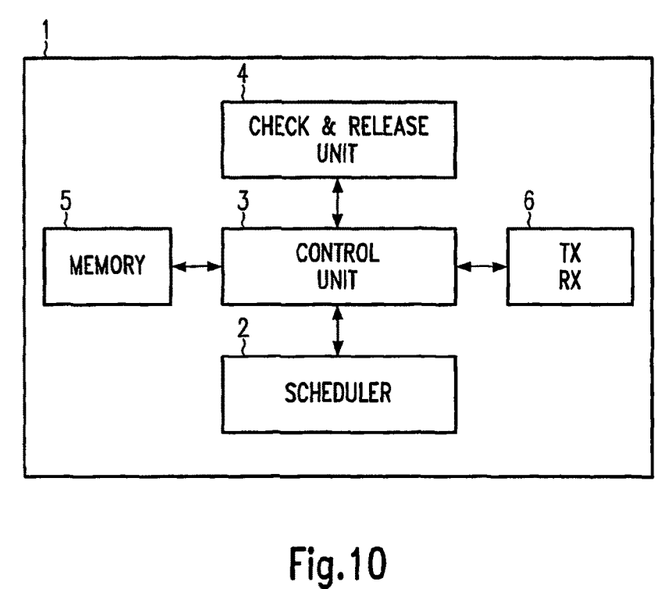
FIG. 10 shows structural details in block diagram form of a base station implementing the scheduling algorithm according to the invention.

FIG. 10 shows exemplarily some structural details in block diagram form of a scheduler implemented in a transmitter (e.g. either the base station or mobile station) for carrying out the scheduling algorithm according to the invention.

As apparent from the figure, transmitter 1 includes a scheduler 2, a control unit 3 and a check and release unit 4, as well as buffer memory 5 and transceiver circuitry 6. All other conventional structural details of the transmitter have been omitted as far as they have no direct impact of the invention. The scheduler 2 together with the control unit 3 implements the scheduling algorithm 10 and potentially 50 shown in FIG. 5. The checks on the fulfillment or violation of the resource constraint 30 and subsequent potential release of allocation units 40 are performed in the check and release unit 4. Resource constraint values are preferably stored in a memory 5 which is accessed by the control unit 3 to be available to scheduler 2 and check and release unit 4. Alternatively scheduler 2 and check and release unit 4 may have direct access to memory 5. The resource constraint values may be updated upon system initialization, connection setup, or upon receiving a corresponding command from the network controller of the system.

Finally, the transmitter comprises transmission and receiving circuitry 6 for sending and receiving data and control signals using its antenna over the air interface. A s mentioned before, preferably signaling data concerning the release of allocation units are transmitted to or received from other transmitting and receiving units of the system. Again, the details of the transmission and receiving operation using logical data channels and control channels is known for the person skilled in the art in the field of communications.

Although the above description has been focused on having the scheduler implemented in the base station acting as transmitter, the principles of the present invention may be readily applied by those skilled in the art to a mobile terminal acting as transmitter for sending data to a base station as the receiving unit, i.e. uplink. In this case, the scheduler is implemented in the mobile station to perform the scheduling algorithm as described above. The resource constraint is either defined by the mobile itself or upon prior instructions from the base station or network controller of the communication system.

The invention claimed is:
1. A method for performing a scheduling algorithm with minimum resource scheduling in a mobile communication system, comprising:
 scheduling allocation units for a user or service on a per-scheduling frame basis, wherein each scheduling frame comprises a plurality of allocation units,
 checking whether the allocation units that are scheduled for the user or service in a current scheduling frame meet at least one resource constraint, releasing the allocation units that are scheduled for the user or service for said current scheduling frame in response to a result of checking whether the allocation units that are scheduled for the user or service in said current scheduling frame meet the at least one resource constraint, and re-scheduling the released allocation units in the current scheduling frame to at least one other user or service, wherein the method further comprises:

checking whether at least one other resource constraint is not violated by the releasing of the allocation units, and performing the releasing of the allocation units that are scheduled for the user or service only if the at least one other resource constraint is not violated by the releasing of the allocation units.

2. The method according to claim 1, wherein the scheduling comprises considering at least one of a channel condition parameter, an amount of data available for transmission to a specific user, a quality of service, a delay, a data rate and a carrier to interference ratio.

3. The method according to claim 1, wherein the scheduling frame has at least one of a time division, frequency division or code division frame structure.

4. The method according to claim 1, wherein the at least one resource constraint is a user or service based requirement.

5. The method according to claim 1, wherein the at least one resource constraint is a scheduling frame based requirement.

6. The method according to claim 1, wherein the at least one resource constraint is defined based on a proportion of available scheduling frame resources.

7. The method according to claim 1, wherein the at least one resource constraint is represented by a minimum number of scheduled allocation units for the user or service.

8. The method according to claim 1, wherein the allocation units have a quantity of one of transmittable information bits, Internet Protocol packets, code blocks or modulation symbols.

9. The method according to claim 1, wherein the checking of whether the at least one other constraint is violated comprises determining a quality of service parameter such as a maximum allowable delay or long-term data rate.

10. The method according to claim 1, further comprising signaling to the user a result of the scheduling algorithm, including whether the allocation units are released.

11. The method according to claim 10, wherein the signaling is transmitted on an associated control channel.

12. The method according to claim 1, wherein the checking and the releasing of the allocation units are carried out in a time sequential manner by the scheduling algorithm for all users or services.

13. A scheduling apparatus for use in a mobile communication system and for performing a scheduling algorithm with minimum resource scheduling, comprising:

a scheduling unit comprising a processor for scheduling allocation units for a user or service on a per-scheduling frame basis, wherein each scheduling frame comprises a plurality of allocation units, a checking unit for checking whether the allocation units that are scheduled for the user or service in a current scheduling frame meet at least one resource constraint and for providing a result of the checking, and a releasing unit for releasing the allocation units that are scheduled for the user or service for the current scheduling frame in response to the result provided by the checking unit, wherein the scheduling unit is configured to re-schedule the released allocation units in the current scheduling frame to at least one other user or service, and wherein the scheduling apparatus further comprises a determining unit for determining whether at least one other resource constraint is not violated by the releasing of the allocation units and for allowing the releasing of the allocation units that are scheduled for the user or service only if the at least one other resource constraint is not violated by the releasing of the allocation units.

14. The scheduling apparatus according to claim 13, further comprising a signaling unit for signaling to the user a result of the scheduling algorithm, including whether the allocation units are released.

15. A base station comprising a scheduling apparatus according to claim 13.

16. A mobile terminal comprising a scheduling apparatus according to claim 13.

17. A mobile communication system comprising a transmitter and a scheduling apparatus according to claim 13 and a receiver, the receiver further comprising a processing unit for processing information on a result of the scheduling algorithm, and a control unit for shutting down at least part of the mobile communication system's receiving circuitry for the duration of a scheduling frame for which no allocation units are scheduled to the receiver.

18. A mobile communication system comprising a scheduling apparatus according to claim 13 and a transmitter, the transmitter further comprising a processing unit for processing information on a result of the scheduling algorithm, and a control unit for shutting down at least part of the mobile communication system's transmitting circuitry for the duration of a scheduling frame for which no allocation units are scheduled to the transmitter.

19. The scheduling apparatus according to claim 13, further comprising a signaling unit for signaling to the user a result of the scheduling algorithm, including whether the allocation units are released.

* * * * *